Nov. 10, 1953 — E. H. SCHULTZ — 2,658,809

HYDRAULIC FLUID SEAL

Filed May 17, 1948

INVENTOR.

Edward H. Schultz

BY

Morsell & Morsell

ATTORNEYS.

Patented Nov. 10, 1953

2,658,809

UNITED STATES PATENT OFFICE 2,658,809

HYDRAULIC FLUID SEAL

Edward H. Schultz, Milwaukee, Wis.

Application May 17, 1948, Serial No. 27,451

2 Claims. (Cl. 309—34)

This invention relates to improvements in hydraulic fluid seals.

Hydraulic fluid seals which are used in rams, jacks and similar devices, must operate under a wide range of hydraulic pressures. In order that a seal may withstand high pressures, the sealing material must be strong enough to resist extrusion through the clearance between the cylinder and the plunger. This requires a sealing material which is so hard as to be unsuitable for sealing light pressures unless it is installed so tightly that the frictional resistance between the seal and the cylinder creates operating difficulties and rapid wear. On the other hand, a sealing material that is resilient enough to seal light pressures well has the disadvantage of extruding through the clearance between the cylinder and the plunger, unless this clearance is so extremely close as to make production costs prohibitive.

It is, therefore, a general object of the invention to provide an hydraulic fluid seal which will operate efficiently at pressures ranging from zero to very high pressures.

A further object of the invention is to provide an hydraulic fluid seal of the class described which operates efficiently without the necessity of an extremely close clearance between the cylinder and the piston.

A further, more specific object of the invention is to provide a seal including a ring of round cross sectional shape made of comparatively soft resilient material, and which is installed so that it is under slight diametrical compression to seal zero and low pressures; and said seal including a relatively hard backing ring molded to such shape as to coact with said resilient ring in providing a seal which will perform effectively at both low and high pressures.

A further object of the invention is to provide an hydraulic fluid seal of the class described wherein the relatively hard ring is formed with portions which are expandable under higher pressures to take up the normal clearances between the cylinder and the piston and to thereby prevent extrusion of the soft ring.

A further object of the invention is to provide a combination seal of the class described having a backing ring which is expandable to the size of the cylinder as the pressure thereon increases, and which is contractable when said pressure is released to permit movement of the piston within the cylinder with a minimum of frictional resistance.

A further object of the invention is to provide a seal of the class described which is simple in construction, which is economical to manufacture and install, and which saves a large amount of manufacturing expense by reason of the fact that it permits less exacting tolerances between the piston on which it is used and the cylinder in which said piston operates.

With the above and other objects in view, the invention consists of the improved hydraulic fluid seal, and all its parts and combinations, as set forth in the claims, and all equivalents thereof.

In the accompanying drawing, wherein are shown two complete embodiments of the invention, and wherein the same reference numerals indicate the same parts in all of the views.

Figure 1:
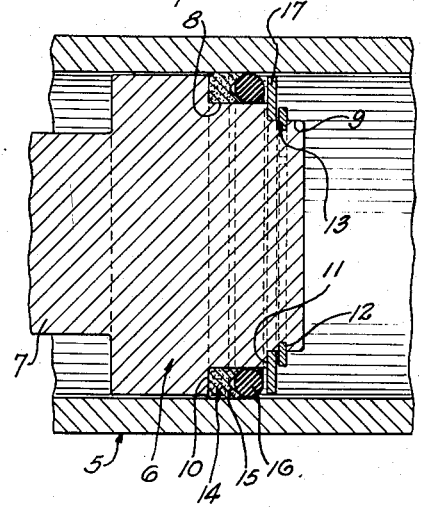
Fig. 1 is a fragmentary, longitudinal sectional view of a piston positioned in a cylinder and provided with the preferred form of the improved seal.
Figure 2:
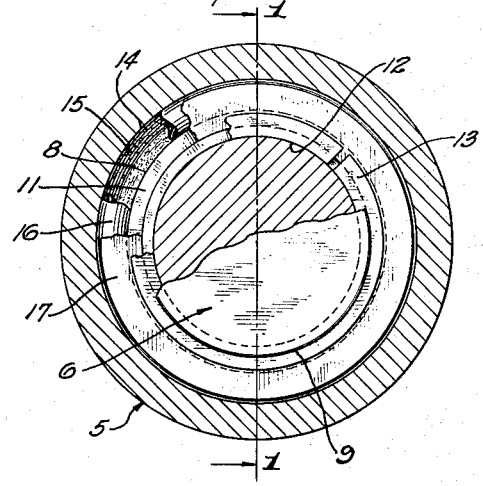
Fig. 2 is an end view of the piston and cylinder shown in Fig. 1, parts being broken away and shown in section.

Referring more particularly to Fig. 1 of the drawing, the numeral 5 indicates an hydraulic cylinder, and the numeral 6 indicates the piston slidably positioned therein. The piston 6 is formed at its outer end with a piston rod 7 which is adapted to extend exteriorly of the cylinder. Near its inner end the piston 6 is formed with a portion of reduced diameter 8, and inwardly of the portion 8, the piston 6 is formed with a portion of further reduced diameter 9. A shoulder 10 is formed by the portion of reduced diameter 8, and a shoulder 11 is formed by the portion of reduced diameter 9. The portion of reduced diameter 9 is formed with an annular groove 12, which is adapted to receive a removable snap ring 13. A flat retaining washer 17 is adapted to fit around the portion 9 of the piston 6 and is held in position against the shoulder 11 by the snap ring 13.

Positioned around the portion 8 of the piston 6, and in contact with the shoulder 10 thereof, is a backing ring 14. The ring 14 is substantially rectangular in cross section with the exception that the inner surface thereof is formed with a V-shaped groove 15. The ring 14 has an external diameter substantially equal to the internal diameter of the cylinder 5. Positioned around the portion 8 of the piston 6 axially inwardly and adjacent to the ring 14 is a ring 16. The ring 16 has a substantially round cross sectional shape and is of such size that when it is installed as shown in Fig. 1, it is under slight diametral compression.

The ring 16 may be made of any suitable relatively soft resilient material. Rubber, either natural or synthetic, having a durometer hardness of approximately 70, has been found to give satisfactory results when used in the ring 16. The ring 14 is preferably made of any suitable material which is strong enough to resist extrusion through the clearance which may exist between the cylinder 5 and the piston 6. This material must be relatively hard and yet it must have a certain amount of flexibility. Any suitable material may be used for this purpose, such as for example, hard natural or synthetic rubber, leather, certain forms of plastic materials, or such metals as brass or the like.

The backing ring 14 and the ring 16 are held in position on the portion 8 of the piston 6 by the retaining washer 17. When relatively low hydraulic pressures are exerted against the piston 6, the relatively soft ring 16 provides an efficient seal to prevent leakage of fluid past the piston. Under these lower pressures the backing ring 14 retains its normal shape, and there is relatively little friction between it and the cylinder 5. When higher pressures are exerted against the piston 6, however, the increased pressure will force the ring 16 axially outwardly against the grooved portion 15 of the ring 14 and will spread apart the lips on each side of the groove 15 causing them to engage and seal themselves against the inner surface of the cylinder 5 and the portion 8 of the piston. Due to the fact that the lips of the ring 14 are expandable in this manner under higher pressures, there is no clearance space into which the ring 16 can be extruded by the higher pressures. When the pressures within the cylinder 5 acting against the piston 6 are reduced, and when the pressure is no longer sufficient to maintain the lips of the ring 14 in extended condition, the ring 14 will return to its normal shape and the ring 16 will again become the more effective sealing member of the two. After a certain period of wear a certain amount of clearance will develop between the ring 14 and the cylinder. There is no danger of extrusion of the ring 16 into this space at lower pressures, and at higher pressures the lips of the ring 16 expand to fill this space.

It is apparent that the improved combination seal is operable through an extremely wide range of pressures while maintaining high efficiency throughout the entire range. It is unnecessary to maintain extremely close tolerances between the piston and the cylinder when the improved seal is used, and yet there is no danger of extrusion of any part of the improved seal into the relatively large clearance spaces permitted.

Figure 3:
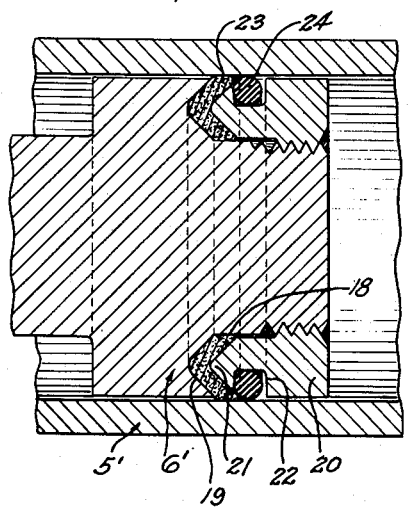
Fig. 3 is a fragmentary, longitudinal sectional view of a piston positioned in a cylinder and provided with a modified form of the improved seal.
Figure 4:
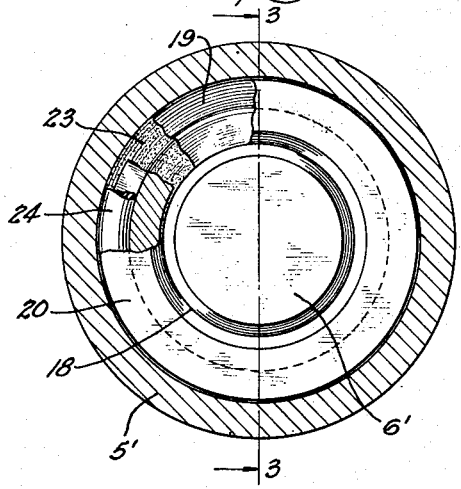
Fig. 4 is an end view of the piston and cylinder shown in Fig. 3, parts being broken away and shown in section.

Fig. 3 shows a modified form of the improved seal wherein a piston 6' is positioned in a cylinder 5'. The inner end of the piston 6' is formed with a portion of reduced diameter 18. A shoulder formed with an annular groove 19, which is V-shaped in cross section, is formed on the piston 6' at the outer end of the portion 18. A collar 20 is threaded on the portion 18 as shown in Fig. 3. The collar 20 has an exterior diameter substantially equal to that of the piston 6' and is formed on one end with a convex surface portion 21 of substantially the same shape as the groove 19. The collar 20 is also formed near the portion 21 with a peripheral groove 22, which is rectangular in cross section.

A backing ring, which is substantially V-shaped in cross section to fit the shape of the groove 19, is positioned on the portion 18 of the piston 6' between the groove 19 and the portion 21 of the collar 20. The ring 23 has an external diameter substantially equal to the internal diameter of the cylinder 5' and it has an internal diameter substantially equal to the portion 18. The groove 22 is preferably so positioned that portions of the ring 23 are positioned radially outwardly of portions of said groove. The ring 23 is preferably made of the same material as the ring 14, shown in Fig. 1. The ring 24, has a substantially round cross sectional shape and is positioned in the groove 22 of the collar 20. The ring 24 is of such size that when it is installed, it is under slight diametral compression between the collar 20 and the cylinder 5'. The ring 24 is preferably made of the same material as the ring 16 shown in Fig. 1.

In operation, when slight hydraulic pressures are exerted against the piston 6', the ring 24 serves as an efficient seal between the piston 6' and the cylinder 5'. However, when higher pressures are exerted against the piston 6', the peripheral portions of the ring 23 are forced radially outwardly into contact and sealing engagement with the inner surface of the cylinder 5'. When the pressures within the cylinder 5' are again reduced, the pressure exerted on the peripheral portions of the ring 23 are no longer sufficient to hold said peripheral portions in contact with the inner surface of the cylinder 5', and the ring 23 returns to its normal shape. Under this condition, the ring 24 again serves as the more effective sealing member. It is apparent that the operation of the modified form of the improved seal is similar to that of the preferred form.

While for purposes of illustration, the seal has been shown as carried by the piston member rather than by the cylinder member, it is obvious that the parts may be reversed so that the seal is carried by the cylinder. Various other changes and modifications may be made without departing from the spirit of the invention, and all of such changes are contemplated, as may come within the scope of the claims.

What I claim is:

1. A fluid seal for use in hydraulic rams or the like having a piston, a cylinder in which said piston travels, and normally having fluid in said cylinder inwardly of said piston, comprising a portion of reduced diameter formed on the piston forming a shoulder, said shoulder being formed with an annular V-shaped grooved surface facing the fluid, a backing ring having a V-shaped cross-section to provide angled portions positioned in said groove, said backing ring being formed of relatively hard and substantially non-extrudable material, a peripheral portion of said backing ring being expandable into sealing engagement wtih the cylinder, a collar threaded on said portion of reduced diameter and having one end in engagement with said backing ring, and a second ring carried by said collar and engageable with peripheral portions of the backing ring, said second ring being in sealing engagement with the collar and the cylinder and having an annular portion exposed to said fluid.

2. A fluid seal for use in hydraulic rams or the like having a piston, a cylinder in which said piston travels, and normally having fluid in said cylinder inwardly of said piston, comprising a portion of reduced diameter formed on the piston forming a shoulder, said shoulder being formed with an annular V-shaped grooved surface facing the fluid, a backing ring having a V-shaped cross-section to provide angled portions positioned in said groove, said backing ring being formed of relatively hard and substantially non-extrudable material, a peripheral portion of said backing ring being expandable into sealing engagement with the cylinder, a collar threaded on said portion of reduced diameter and having one end in engagement with said backing ring, said collar being formed adjacent said end with a peripheral groove portions of which open radially outwardly onto an angled portion of said backing ring, and a second ring positioned in said collar groove and engageable with said angled portion of the backing ring, said second ring being in sealing engagement with the collar and with the cylinder and having an annular portion exposed to said fluid.

EDWARD H. SCHULTZ.

References Cited in the file of this patent

UNITED STATES PATENTS

| Number | Name | Date |
|---|---|---|
| 2,188,957 | Pfauser | Feb. 6, 1940 |
| 2,306,800 | Caldwell | Dec. 29, 1942 |
| 2,420,104 | Smith | May 6, 1947 |
| 2,427,787 | Hunter | Sept. 23, 1947 |
| 2,427,789 | Kehle | Sept. 23, 1947 |
| 2,437,814 | Hallen | Mar. 16, 1948 |
| 2,456,356 | Aber | Dec. 14, 1948 |
| 2,494,598 | Waring | Jan. 17, 1950 |